Feb. 12, 1952          E. H. REICHL          2,585,274
                       CATALYTIC REACTOR
Filed Dec. 22, 1944                          2 SHEETS—SHEET 2

Inventor:
Eric H. Reichl
By: Everett A. Johnson
Atty.

Patented Feb. 12, 1952

2,585,274

UNITED STATES PATENT OFFICE 2,585,274

CATALYTIC REACTOR

Eric H. Reichl, Tulsa, Okla., assignor to Stanolind Oil and Gas Company, Tulsa, Okla., a corporation of Delaware Application December 22, 1944, Serial No. 569,413

1 Claim. (Cl. 23—288)

This invention relates to improved method and means for controlling the temperature of exothermic reactions and more particularly relates to temperature control of exothermic reactions employed in the synthesis of hydrocarbons.

A major problem in the synthesis of hydrocarbons by the catalytic reduction of carbon monoxide is that of heat removal and temperature control.

In a reactor for synthesizing 4000 to 5000 barrels per day of liquid product, the heat of reaction which is liberated may amount to about 300 to 400 million B. t. u. per hour. It is not only necessary to remove this vast amount of heat, but it is also necessary that the conversion temperature in the synthesis zone be maintained within relatively narrow limits, any undue temperature rise or hot spots tending to cause the reaction to run away and produce primarily methane and carbon dioxide instead of the desired liquid hydrocarbons and to ruin the activity of the catalyst. Therefore a further object of this invention is to provide a system wherein the synthesis temperature may be controlled and maintained within the desired limits.

In previous systems, fixed bed catalyst reactors have been used with cooling surfaces provided for contacting substantially each increment of the fixed catalyst bed. A 5000 barrel per day system would thus require a reactor system containing approximately 1,400,000 square feet of cooling surface. Not only is the investment and operating cost of such a system extremely high, but the problem of temperature control is still substantially unsolved because the catalyst particles are extremely poor conductors of heat with the result that catalyst which is even a few millimeters from the cooling surfaces is at a temperature much higher than desired. An object of my invention is to provide a method and means whereby the heat of synthesis reaction can be removed and the reaction temperature may be controlled within a relatively narrow range without encountering the inevitable difficulties which are inherent in fixed bed operations.

A further object of this invention is to provide improved method and means for employing the so-called "fluid type" catalyst technique in effecting hydrocarbon synthesis from carbon monoxide and hydrogen. Other objects will become apparent as the detailed description of this invention proceeds.

In general the objects of this invention are attained by employing a fluidized catalyst reaction system and a plurality of bayonet-type cooling tubes extending within the reaction zone. By this means, the heat of reaction is removed with a minimum of disturbance from a mechanical, as well as a chemical, point of view. This can best be accomplished by providing a system including a vessel, means for distributing the feed gas over the entire area of the vessel, a set of cooling tubes extending within the reactor, and providing a controllable amount and distribution of cooling surface within the reactor. Thus the bayonet-type tube assembly removes the heat directly from the fluidized dense turbulent catalyst phase. A characteristic of the fluidized dense turbulent catalyst phase is that the temperature is uniform throughout the bed of catalyst and can be controlled at the desired temperature level by means of the cooling tubes. Both aspects are essential to the successful operation of a process wherein an exothermic reaction, such as the conversion of hydrogen and carbon monoxide to hydrocarbons, is conducted.

The catalyst, whether it be the cobalt type or iron type, should be of relatively small particle size so that it may be fluidized by an up-flowing gas or vapor stream. The maintenance of the suspended dense turbulent catalyst phase in the synthesis reactor insures uniform temperature throughout the reactor. In order to prevent the temperature level of the reactor from gradually increasing or, in other words, to remove the heat of reaction, I employ the plurality of bayonet-type cooling tubes which extend through substantially the entire depth of dense catalyst.

In systems of this type, catalyst solids of small particle size are fluidized by up-flowing gases or vapors within the reactor so that the catalyst within the reactor is maintained in a turbulent liquid-like dense phase, the extreme turbulence of the suspended catalyst particles resulting in the maintenance of uniform temperatures throughout the entire mass of catalyst within the reactor. The catalyst particles of the order of 2 to 200 microns or larger, preferably 20 to 100 microns in particle size and with vertical gas velocity of the order of about .4 to 6.0, preferably between about 1 and about 3, for example, about 2.0 feet per second, a liquid-like dense phase of catalyst is obtained in which the density is between about 30 and about 90%, preferably between about 40 and about 80, e. g., about 60% of the density of the settled catalyst material. The vertical velocity of the reaction gases are, in any event, regulated so as to produce a turbulent suspension of catalyst within the reactor.

The catalyst for the synthesis reaction may be either of the cobalt type or of the iron type. The cobalt type promotes the reaction:

$$2nH_2 + nCO \rightarrow (CH_2)_n + H_2O$$

and the iron-type catalyst promotes the reaction:

$$3nH_2 + 3nCO \rightarrow 2(CH_2)_n + nH_2O + nCO_2$$

In either case, the catalyst should be in finely divided form so that it can be fluidized by gases flowing upwardly through the body of catalyst at low velocity. The use of catalyst particles of such structure, shape, and size as to be fluidized by up-flowing gases of the above velocities is an important feature of the invention.

In general, the catalyst for the conversion step is preferably one or more group VIII metal or metal oxide preferably nickel or iron or mixtures thereof with each other or with copper. The catalyst may be promoted by other metals or metal compounds such as those of aluminum, magnesium, manganese, calcium, uranium, chromium, molybdenum, vanadium, and the like. The catalyst may be supported on a suitable carrier such as clay, silica gel, alumina, Super Filtrol, etc.

An active iron-type catalyst can be prepared by a number of methods well known in the art and may, for example, be of the precipitated type supported upon Super Filtrol or other carrier. Alternatively, an iron catalyst of the type used for ammonia synthesis can be employed, such catalyst ordinarily being prepared by oxidizing iron in a stream of oxygen, fusing the oxide, and crushing. Various promoters may be added. Another method employs the decomposition of iron carbonyl to form an iron powder which may be pelleted and sintered. Catalyst particles without support may have a bulk density as high as about 120 to 150 pounds per cubic foot, whereas the bulk density of iron catalyst precipitated on Super Filtrol or other carrier may be as low as about 10 pounds per cubic foot.

The temperature of the synthesis step, when employing an iron-type catalyst, usually is within the range of between about 450 and about 675° F., for example about 600° F. A pressure of between about 5 and about 20 atmospheres or higher may be employed.

It is also contemplated that a cobalt-type catalyst may be used consisting essentially of supported cobalt either with or without one or more promoters such as oxides of magnesium, thorium, manganese, titanium, uranium, zirconium, cerium, aluminum, zinc, etc. The cobalt support is preferably an acid-treated bentonite or clay such as Super Filtrol or other material of low calcium or iron content. Other supports include such as kaolin, alumina, silica, magnesia, and the like. The cobalt-carrier ratio may be varied between about 5:1 and .1:1. The catalyst may be reduced before use preferably with hydrogen at a temperature of about 350 to 500° F. and this reduction may be carried out within the reactor proper if desired. A typical catalyst ready for use may contain about 32% cobalt, 1.5 thorium oxide, 2.5% magnesium oxide, and 64% Super Filtrol.

The temperature of the synthesis step employing a cobalt-type catalyst usually is within the range between about 225 and about 450° F., for example between about 350° F. and 400° F. About atmospheric pressure is used, but pressures as high as about 10 atmospheres may be employed.

Instead of the cobalt or iron catalyst, I employ catalysts of the nickel type or of the ruthenium type. Such catalysts are known to the art, and inasmuch as no invention is claimed in their composition or method of preparation, further description is not believed necessary. The invention will be more clearly understood from the following detailed description read in conjunction with the accompanying drawing which forms a part of the specification and wherein:

The synthesis gas stream is introduced into the reactor at a low point therein preferably through a suitable distributor means. A suitable catalyst is a finely divided iron-type or cobalt-type catalyst, referred to above. A suitable catalyst recovery means is employed in the upper portion of the reactor and may comprise a plurality of ceramic filters, cyclones, an enlarged settling space, or a combination of these and other catalyst recovery means.

The reactor cooling system includes the bayonet-type tube assemblies which extend within the dense catalyst phase maintained within the reactor. Cooling water may be supplied by means of a manifold. Saturated steam is generated within the tube assemblies and is withdrawn by one or more of valved lines. Control of the rate of heat removal may be accomplished by variation of the water level or by control of the number of tubes in operation. The cooling tubes may be arranged in separate groups for example by subdividing the steam manifold by means of baffles to provide the latter control. In the first case, the flow of water to each individual tube is the same. The water level will adjust itself automatically according to the heat load on the reactor. Higher heat removal will cause the level to remain in such a position as to cover substantially all of the surface.

The substantially catalyst-free reaction products are withdrawn from the top of the reactor. These gases are then cooled and processed as well known in the art and further treatment will not be described in detail. In general, however, these gases are cooled, hydrocarbons recovered therefrom, and the unreacted gases recycled either to the reaction zone or to the feed preparation step, depending ordinarily upon the hydrocarbon content of the ultimate gas stream.

Figures 1, 2:
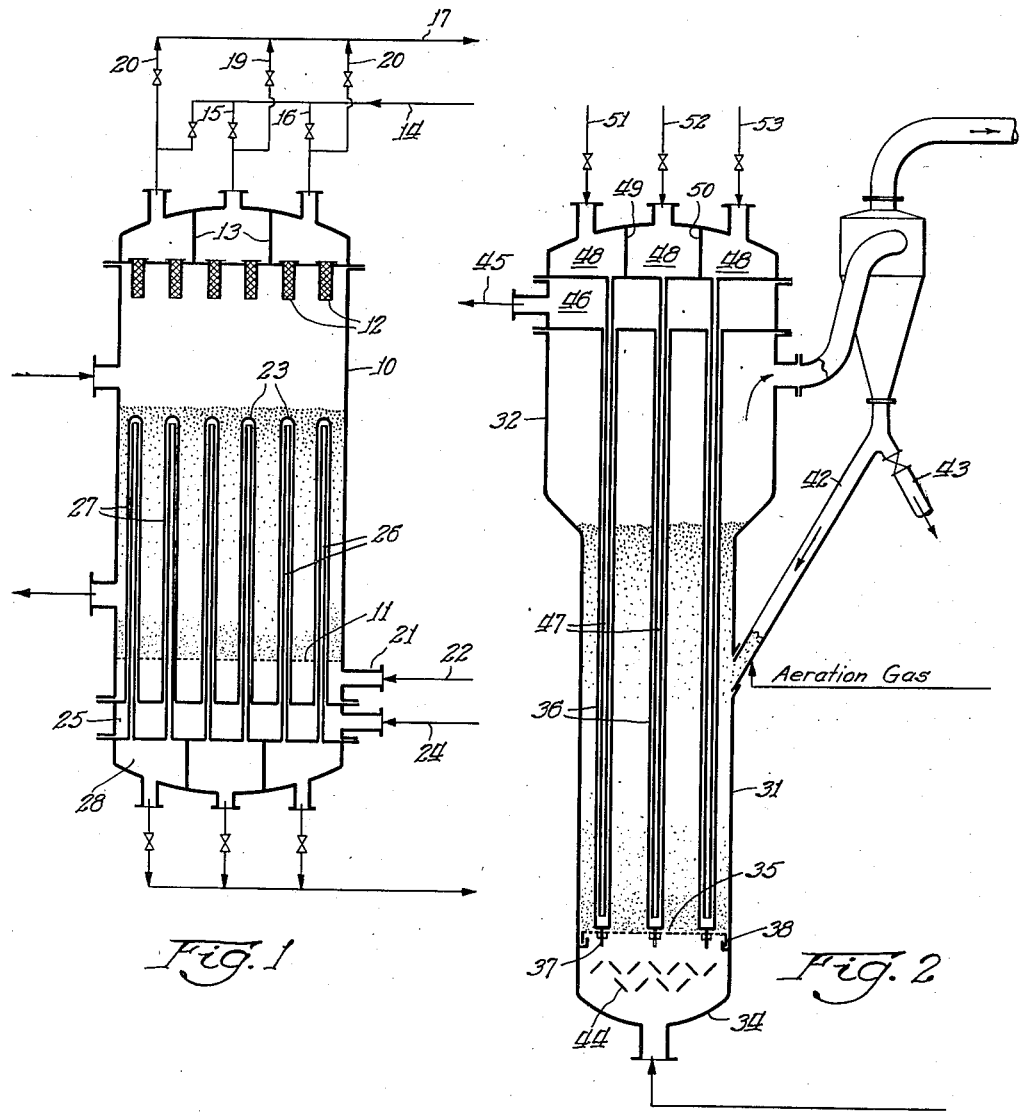
Figure 1 is a vertical section of one embodiment of the synthol reactor.
Figure 2 is a vertical section of a second embodiment of the invention wherein the cooling tubes are suspended overhead and catalyst recovery is by an external cyclone.

Figure 1 is a detailed representation of one embodiment of the synthesis reactor 10 showing, in more or less detail, the essential elements of the design. In general, the preferred configuration is an elongated vessel 10 provided with distributor means 11 and catalyst recovery means 12. When a plurality of separate ceramic filters 12 are mounted in the upper portion of the reactor 10, that portion of the vessel above the filters may be divided into a plurality of sections by baffles 13 to provide a plurality of zones separately communicating with a group of the ceramic filters. Purge lines 14, 15, and 16 introduce gas to blow back the catalyst from the filters 12. Other catalyst recovery means, such as cyclones, either external or internal may be employed in place of the filters 12. Likewise, it is contemplated that the upper portion of the reactor 10 may be of substantially increased diameter to effect considerable settling out of the catalyst due to the reduction in the upward gas velocity. The reaction products in any event are withdrawn from the vessel 10 by lines 18 to 20 when another section of the filters 12 is being purged.

A plurality of inlets 21, for example, four, may be used for introducing the feed gas supplied by line 22. The reactor cooling means may comprise several hundred bayonet-type tubes 23. The outside diameter of the larger tube being about 2 inches, and the outside diameter of the smaller and inner tube being about 1 inch. Thus the total cooling surface required to produce 4000 to 5000 barrels of liquid product per day was about 38,000 square feet when employing the dense turbulent fluidized catalyst phase, whereas a plant of similar capacity employing fixed bed catalyst required approximately 1,400,000 square feet of cooling surface. The bayonet tube 23 extends through about 15 feet of dense phase catalyst maintained above the distributor means 11. Water is supplied by line 24 to the manifold section 25 of the cooling mechanism communicating with the outside tube 26 of each bayonet or thimble unit. The heat exchange fluid flows upwardly to the top of the tube and is withdrawn as steam from the bottom of inner tube 27 which communicates with a steam manifold 28 which may be baffled to provide means to control the amount of cooling. Both the water manifold 25 and the steam manifold 28 in the embodiment shown in Figure 1 are below the point of injection of the feed gas by inlets 21.

In some instances it will be preferred to suspend the cooling tube assembly from the top of the reactor. Figure 2 illustrates such an apparatus.

Figure 4:
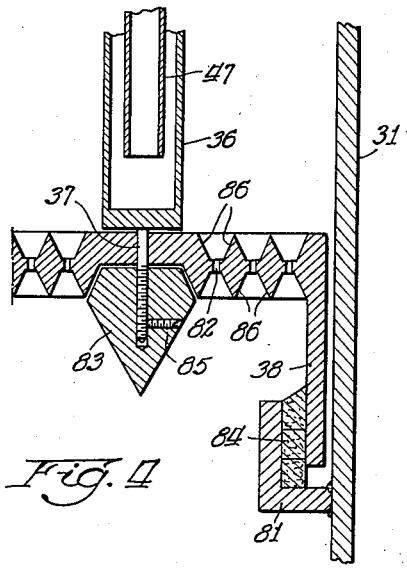

In the embodiment illustrated in Figure 2 of the drawings, a plurality of cooling tubes extend downwardly through a reactor of modified design. The reactor comprises an elongated vessel 31 having an enlarged upper section 32 wherein the catalyst settles out from the reaction products by reason of the reduced velocity therein. The velocity reduction results from the reduction in volume of the reactant gases and from the increased cross sectional area of the reactor. Reactant gases are introduced at a low point in the reactor 31 via line 33 and conical bottom 34. The gases pass through the distributor or grid 35 and upwardly through the reaction zone. The grid 35 has the dual function of anchoring the cooling tubes and of effecting uniform distribution of reactants and catalyst over the cross sectional area of the reactor. The details of this grid distributor-support 35 are described in greater detail with respect to Figure 4.

The cooling system includes a plurality of thimble or bayonet tubes 36 which extend downwardly through the reaction bed and are anchored into the floating grid 35. For this purpose, stud bolt and nut 37 are provided at the terminal of the outer tube in the tube assemblies 36. The grid 35 may be provided with a movable seal 38 at its perimeter. When desired, means may be provided for lifting the tube assembly from the reactor. Alternatively means may be provided for tilting the reactor to a horizontal position to permit rolling the tube assembly therefrom.

The reaction conditions and the properties of the catalyst phase within the reactor 31 may be substantially the same as that described in general terms above. The catalyst is continuously settled out from the reaction products within the upper enlarged settling zone 32. The cooling tubes 36 extend through this enlarged settling zone. Reaction products from which a substantial portion of the catalyst has been removed are withdrawn through line 39 and introduced into an external cyclone 40. It should be understood that the cyclone 40 may be mounted within the reactor for example within the space provided by the enlarged settling zone 32. A substantially catalyst-free reactor effluent is removed by conduit 41. The separated catalyst is accumulated within the cyclone 40 and withdrawn from the bottom thereof by lines 42 or 43. It is preferred to transfer the recovered catalyst by line 42 or its equivalent into the dense turbulent suspended phase maintained within the reactor 31. Alternatively, the catalyst may be withdrawn downwardly through standpipe 43 and recycled to the reactor via line 33, conical bottom 34, and grid 35. Likewise, the recovered catalyst may be withdrawn from the system for regeneration and the like. If desired, auxiliary baffles 44 can be provided within the conical bottom 34.

The operation of the cooling unit is substantially equivalent to that described in connection with Figure 1, the liquid or relatively cool heat exchanger medium being introduced by one of lines 51, 52, 53 into manifold 48. The manifold 48 may be subdivided into a plurality of zones, for example by means of baffles 49 and 50. By this means, banks of tubes can be controlled separately by adjusting the valves in lines 51, 52, 53. The heat exchange medium passes downwardly within the tube 47 and flows upwardly within the inner tube 36 into manifold 46. The relatively hot heat exchange fluid which in the case of water will be steam is withdrawn from the manifold 46 via valved line 45.

Figure 3:
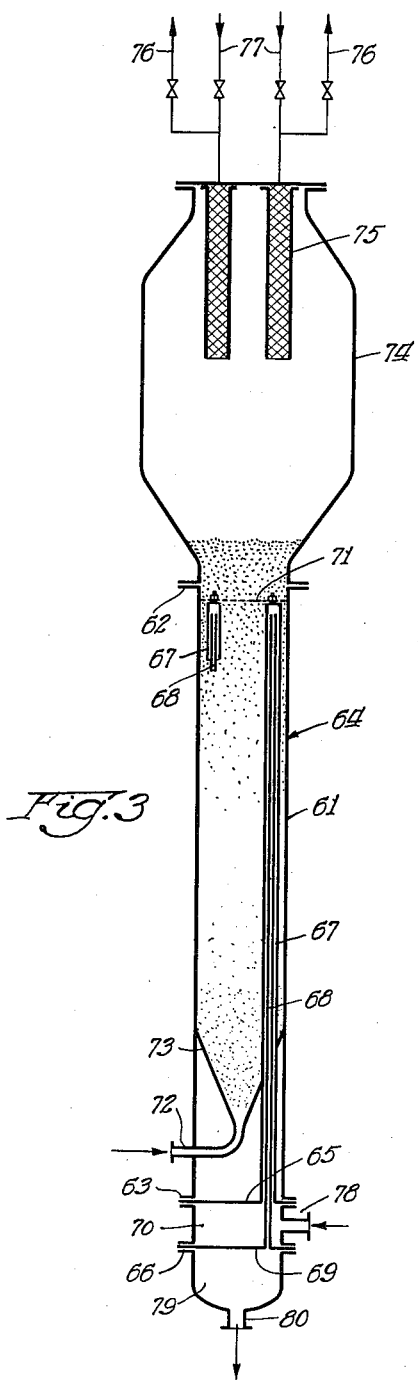
Figure 3 is a vertical section showing a third embodiment of the invention.

In Figure 3, I have illustrated another modification of my apparatus. The reaction section comprises an elongated conduit 61 having flanges 62 and 63. Extending within this reaction section are a plurality of cooling assemblies 64. The outer tube 67 is held by the main tube sheet 65 between the flanges 63 and 66. The inner tubes 68 are supported by secondary tube sheet 69 fixed below manifold section 70. The upper ends of the tubes 67 are held in spaced relation by the spacer bar 71 by means similar to that illustrated in connection with Figure 4. Feed gas is introduced by conduit 72 and passes up through the conical distributing device 73. The distributing device 73 is a cone having walls which make a 10° angle with the vertical center line to maintain the catalyst in a uniform dense turbulent phase. The cooling assemblies 64 pass through the cone 73. Above the reactor 61, I have provided an enlarged catalyst settling zone 74. Within this settling zone 74, there is shown a plurality of Aloxite ceramic filter tubes 75 which communicate with valved outlets 76 and valved purge lines 77. In general the operation of this unit is similar to that described in connection with Figure 2, the temperature being controlled by introducing a cooling fluid such as water or dowtherm into manifold 70 by valved line 78. The cooling medium flows upwardly in the outside annular space between the tubes 67 and 68 and returns downwardly in the inside tube 68. The steam or hot dowtherm is withdrawn from manifold 79 by line 80.

Figure 5:
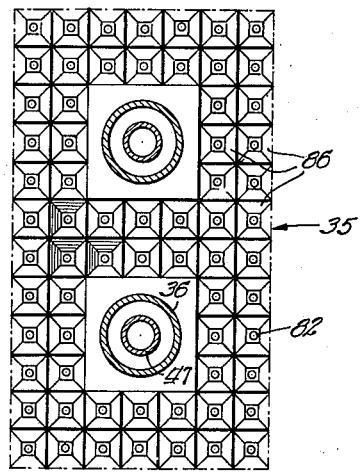
Figures 4 and 5 illustrate a single means having the dual function of restricting the motion of the tubes and of providing a distributor grid.

In connection with Figures 1 and 2, I have illustrated grids 11 and 35 which are adapted to maintain the dense turbulent catalyst phase thereabove. The grid 35 of Figure 2 serves the additional function of limiting the motion of the ends of the cooling tubes 36. To accomplish this, the end of tube 36 is provided with a stud bolt 37 adapted to pass through the grid 35. The grid thereby serves the dual function of a spacer bar and a distributor grid. The grids may be conventional perforated plates, but, in general, I prefer to flare the perforations in the direction of gas flow. This may be accomplished for example by casting the grid in a manner illustrated by Figures 4 and 5. The cast grid 35 has the appearance of a plurality of intersecting rhombic rods. In the depressions between the high surfaces, I provide the openings of the grid. The plane surfaces 86 are preferably between 60 and 80° from the horizontal or plane of the grid 35. In other words, opposite pairs of surfaces are disposed at an angle of between about 20 and 40°. In general the slope of the raised portions of the grid corresponds to the angle of repose of the catalyst employed. The grid may be cast from steel, iron, or an alloy, and because of its construction is self-supporting and rigid.

A lock element 83 is provided for retaining the grid 35 in fixed relation to the tube 36 by means of stud bolt 37. This locking element is preferably streamlined and may comprise a drilled and tapped cone having an apex angle of between about 20 and 40°. A locking pin 85 or an Allen set screw may be used to secure the element 83 in its operative position.

The perforations 82 in the grid 35 are designed to permit the passage of gasiform fluids therethrough with or without catalyst particles suspended therein. A pressure drop of about one pound across the grid makes it possible to retain the catalyst in a dense turbulent suspended phase above the distributor 35. A suitable seal is provided between the perimeter of the grid 35 and the wall of the vessel 31 to allow the longitudinal motion of the grid and cooling assembly while at the same time avoiding the bypassing of the gases. The sealing means may, for example, include trough 81, packing 84, and extension 38 of grid 35. The extension 38 will thus be permitted to move up and down in packing 84 to provide a flexible seal.

When a tube holder is applied to Figure 3, the grid 35 will ordinarily take the form of a spacer bar of minimum restricting area. Thus any substantial pressure drop between the settling chamber 74 and the reactor section 61 will be avoided.

Although the cooling assemblies have been provided with individual headers, it is contemplated that manifolds within the catalyst may be used with the feed gas being introduced above the header, or the header may be provided with gas ducts which would permit the introduction of the feed from below the header.

From the above detailed description, it will be seen that the objects of this invention have been accomplished and that a vastly-improved system for controlling the temperature of exothermic reactions has been provided. Although certain preferred embodiments have been described to illustrate the invention, it should be understood that various other modifications and constructions come within the scope of the claim and will be apparent to those skilled in the art in view of the above description.

What I claim is:

An apparatus comprising a vertically elongated vessel having an upper portion of enlarged cross-section comprising a catalyst separation chamber, a reaction chamber below said catalyst separation chamber, a plurality of separately controllable cooling units vertically suspended within said vessel and extending through both said catalyst separation chamber and said reaction chamber, each of said cooling units comprising an outer tube closed at the lower end communicating at the top with a first manifold and a smaller tube within said outer tube and substantially coextensive therewith, open at the lower end, the upper end of said inner tube communicating with a second manifold, partitions in said second manifold defining sub-manifolds, separate valved inlet means for each of said sub-manifolds, a grid means extending across substantially the entire cross-sectional area of said reaction chamber below said cooling units, a mounting for said grid permitting longitudinal movement thereof within said vessel, means for anchoring the lower end of said outer tube to said grid, a gas inlet means in a lower portion of said vessel below said grid, a distributing chamber between said gas inlet means and said grid, an outlet from the catalyst separation chamber, said outlet communicating with an exterior solids separation means, means for withdrawing gases separately from said separation means and a conduit means extending between said separation means and said reaction chamber for returning separated solids to said reaction chamber.

ERIC H. REICHL.

REFERENCES CITED

The following references are of record in the file of this patent:

UNITED STATES PATENTS

| Number | Name | Date |
| --- | --- | --- |
| 793,696 | Voorhees | July 4, 1905 |
| 1,845,058 | Pier | Feb. 16, 1932 |
| 1,894,768 | Hechenbleikner | Jan. 17, 1933 |
| 1,970,923 | Spalding | Aug. 21, 1934 |
| 2,195,414 | Houdry | Apr. 2, 1940 |
| 2,205,409 | Houdry | June 25, 1940 |
| 2,212,043 | Pyzel | Aug. 20, 1940 |
| 2,357,901 | Lewis et al. | Sept. 12, 1944 |
| 2,360,787 | Murphree et al. | Oct. 17, 1944 |
| 2,367,351 | Hemminger | Jan. 16, 1945 |
| 2,384,858 | Thayer | Sept. 18, 1945 |
| 2,394,680 | Gerhold et al. | Feb. 12, 1946 |
| 2,399,050 | Martin | Apr. 23, 1946 |
| 2,409,780 | Mekler | Oct. 22, 1946 |
| 2,413,271 | Warrick | Dec. 24, 1946 |
| 2,429,751 | Gohr et al. | Oct. 28, 1947 |
| 2,430,443 | Becker | Nov. 11, 1947 |

FOREIGN PATENTS

| Number | Country | Date |
| --- | --- | --- |
| 236,434 | Germany | July 6, 1911 |
| 244,267 | Germany | Mar. 5, 1912 |

OTHER REFERENCES

"The Refiner," vol. 21, No. 6, page 37.